(12) United States Patent
Nakamura

(10) Patent No.: US 7,461,735 B2
(45) Date of Patent: Dec. 9, 2008

(54) SUSPENSION CONVEYANCE APPARATUS

(75) Inventor: Jirou Nakamura, Osaka (JP)

(73) Assignee: Daifuku Co., Ltd. (JP)

( * ) Notice: Subject to any disclaimer, the term of this patent is extended or adjusted under 35 U.S.C. 154(b) by 106 days.

(21) Appl. No.: 11/576,104

(22) PCT Filed: Sep. 9, 2005

(86) PCT No.: PCT/JP2005/016585

§ 371 (c)(1),
(2), (4) Date: Mar. 27, 2007

(87) PCT Pub. No.: WO2006/038423

PCT Pub. Date: Apr. 13, 2006

(65) Prior Publication Data

US 2008/0041699 A1    Feb. 21, 2008

(30) Foreign Application Priority Data

Oct. 5, 2004 (JP) ............................ 2004-292351
Oct. 5, 2004 (JP) ............................ 2004-292353

(51) Int. Cl.
B65G 17/20 (2006.01)
B65G 35/00 (2006.01)
B61B 10/02 (2006.01)

(52) U.S. Cl. ............... 198/465.4; 198/473.1; 198/474.1

(58) Field of Classification Search ............. 198/465.4, 198/473.1, 474.1; 104/89
See application file for complete search history.

(56) References Cited

U.S. PATENT DOCUMENTS 4,462,315 A * 7/1984 Wakabayashi ........... 104/172.4
5,364,469 A * 11/1994 Wakabayashi ............... 118/423
6,814,219 B2 * 11/2004 Shimizu .................. 198/465.4
2006/0032728 A1 * 2/2006 Smith et al. .............. 198/468.6

FOREIGN PATENT DOCUMENTS

JP          04046861 A  *  2/1992
JP          4-153118       5/1992

* cited by examiner

*Primary Examiner*—Mark A Deuble
(74) *Attorney, Agent, or Firm*—Schweitzer Cornman Gross & Bondell LLP (57) ABSTRACT

A support structure for a receiver (18) which is provided on a hanger arm for supporting an object to be conveyed and the position of which can be switched is simplified. A suspension conveyance apparatus has a long hole (31) provided at a shaft support section for a parallel link (24) that laterally movably supports a receiver (18) and permitting vertical movement of the receiver (18), a spring (28*a*) for urging the receiver (18) to a direction to pull down the receiver (18) on to a receiver support member (21*a*), an engagement member (33) provided on the receiver supporting member (21*a*) side, and two inner and outer engagement recesses (32*a*, 32*b*) arranged on the receiver (18) side so as to engage with the engagement member (33) when the receiver (18) is at both inner and outer positions (P1, P2), at a level at which the receiver (18) is supported by the receiver support member (21*a*). A receiver drive means (42) for laterally moving the receiver (18) between both inner and outer positions (P1, P2) is provided at a receiver switching position in a traveling route of a conveying traveling body (1).

8 Claims, 7 Drawing Sheets

SUSPENSION CONVEYANCE APPARATUS

TECHNICAL FIELD

The present invention relates to a suspension conveyance apparatus in which a hanger for supporting an object to be conveyed suspended from a conveying traveling body is provided with pairs of left and right openable and closable hanger arms which have receivers for receiving an object to be conveyed on lower end inner sides and whose upper end sides are pivotally supported so as to freely swing to the left and right.

BACKGROUND ART

In the suspension conveyance apparatus described above, as described in Japanese Published Unexamined Patent Application No. H04-153118, there is known a construction in which the receivers can be switched in position between inner and outer positions in the opening and closing direction with respect to the hanger arms so as to adapt to a change in distance between supported positions of both left and right sides of an object to be conveyed (positions supported by the receivers). In detail, the receiver is supported movably straightly on a receiver support member on the hanger arm side in a manner enabling it to laterally move between inner and outer positions in the opening and closing direction, and on the receiver side, a lock pin that freely elevates and a spring that urges the lock pin downward are provided, a lock pin slide guide having engagement recesses on both ends in which the lock pin falls and engages due to an urging force of the spring is provided on the receiver support member side, and at receiver switching positions set in a traveling route of a conveying traveling body, a lock pin pushing-up means for pushing up the lock pin engaged in the engagement recess to unlock the receiver and a receiver drive means for laterally moving the receiver in the position switching direction are provided.

SUMMARY OF THE INVENTION

The conventional construction described in the Japanese Published Unexamined Patent Application No. H04-153118 is a structure in which the positions of the receivers are not determined unless the receivers are locked by the lock pins at the inner and outer positions in the opening and closing direction, and it is necessary to unlock the receivers by pushing up the lock pins at both a combination of a point at which the receivers are switched from the inner positions to the outer positions and a point at which the receivers are switched from the outer positions to the inner positions. In addition, not only slide guide rails for supporting the receivers movably between the inner and outer positions but also elevating lock pins and lock pin slide guides for guiding the lock pins are necessary, and this makes the structure complicated and increases the size of the entire receiver section.

An object of the invention is to provide a suspension conveyance apparatus capable of solving the above-described conventional problem, which is provided with a hanger (14) for supporting an object to be conveyed suspended from a conveying traveling body (1) having a pair of left and right openable and closable hanger arms (16) which have receivers (18) for receiving an object to be conveyed (W) on their lower end inner sides and whose upper end sides are pivotally supported so as to freely swing to the left and right, where the receivers (18) are switchable in position between inner positions (P1) and outer positions (P2) in the opening and closing direction with respect to the hanger arms (16), wherein the receiver (18) is supported on receiver support members (21a and 21b) on the hanger arm (16) side by parallel links (23 and 24) laterally movably between the inner and outer positions (P1 and P2), and at shaft support sections of the parallel links (23 and 24), long holes (31) which allow vertical movement of the receivers (18) are provided and urging means (28a and 28b) are provided which urge the receiver (18) to a direction to pull down the receiver (18) onto the receiver support members (21a and 21b), and at a receiver switching position in a traveling route of the conveying traveling body (1), a receiver drive means (42) for laterally moving the receiver (18) between the inner positions (P1) and the outer positions (P2) is provided.

When carrying out the invention constructed as described above, in detail, as in a second aspect, among engagement recesses (32a and 32b), at least an inner engagement recess (32a) which engages with an engagement member (33) when the receiver (18) is at the outer position (P2), and this engagement member (33) are shaped to prevent the receiver (18) from moving to the inner position (P1), and among the receiver switching positions at which the receiver drive means (42) is provided, at least at the receiver switching position for switching the receiver (18) from the outer position (P2) to the inner position (P1), a receiver pushing-up means (41) which means push up the receiver (18) from a level supported by the receiver support members (21a and 21b) to release the engagement between the inner engagement recess (32a) and the engagement member (33) can also be provided.

When employing the construction according to the second aspect, as in a third aspect, among the engagement recesses (32a and 32b), at least the outer engagement recess (32b) which engages with an engagement member (33) when the receiver (18) is at the inner position (P1), and this engagement member (33) can be formed into shapes so that the receiver (18) gets onto the engagement member (33) when the receiver (18) moves to the outer position (P2).

When employing the construction according to the second aspect, as in a fourth aspect, a pair of receiver support members (21a and 21b) are arranged in parallel, and on the receiver (18) supported on the receiver support members (21a and 21b), link shaft support members (22a and 22b) which freely fit between the pair of receiver support members (21a and 21b) are projectedly provided, and parallel links (23 and 24) are interposed between lower support shafts (26a and 26b) laid across the pair of receiver support members (21a and 21b) and upper support shafts (27a and 27b) provided on the link shaft support members (22a and 22b), the long holes (31) at the shaft support sections of the parallel links (23 and 24) are provided as shaft holes which the upper support shafts (27a and 27b) of the parallel links (23 and 24) are inserted through, the two inner and outer engagement recesses (32a and 32b) are formed on the lower sides of the link shaft support members (22a and 22b), the engagement member (33) is laid across the pair of receiver support members (21a and 21b), the receiver pushing-up means (41) push the lower sides of the link shaft support members (22a and 22b) between the pair of receiver support members (21a and 21b). Of course, this construction can be carried out in combination with the construction according to a third aspect.

The urging means can be formed of, as in the fifth aspect, tension springs (28a and 28b) interposed between lower support shafts (26a and 26b) and upper support shafts (27a and 27b). This construction can be carried out in combination with the construction according to any one of the first through fourth aspects. When the construction of this fifth aspect is employed, as in the sixth aspect, the link shaft support members (22a and 22b) and the parallel links (23 and 24) are arranged in parallel one pair each, and the tension springs (28a and 28b) can be disposed between the pair of link shaft support members (22a and 22b), and as in the seventh aspect, the tension springs (28a and 28b) are formed to be flat by bending both ends of a straight spring wire into arc shapes on the same plane, and the arc sections on both ends are hooked around the lower support shafts (26a and 26b) and the upper support shafts (27a and 27b). As in the eighth aspect, the tension springs (28a and 28b) can be formed into S shapes by bending the arc sections on both ends oppositely to each other.

According to the suspension conveyance apparatus of the invention constructed as described above, while the receivers are automatically positioned at the inner and outer positions by engagement between the engagement recesses and the engagement members, the engagement members do not need to be movable members like conventional elevating lock pins, and may be members fixed to the receiver support member sides, so that coupled with the structure in which the receivers are supported by parallel links and the lock pin slide guides for guiding the conventional lock pins are unnecessary, the structure of the entire receiver section becomes very simple and can be made small in a size.

The state that the receivers are positioned at the inner and outer positions by engagement between the engagement recesses and the engagement members can be maintained by urging forces of urging means which pull down the receivers to the receiver support member sides, so that the means for locking the receivers at the inner and outer positions are basically unnecessary, however, in the case where the receivers are at the outer positions, when the hanger arms are opened outward for loading and unloading an object to be conveyed, the inward moving directions of the receivers become diagonal up-down directions, and gravity acts to a direction to promote the inward movements of the receivers, so that the engagement recesses get onto and are disengaged from engagement members due to reactive forces against the urging forces and the receivers may unexpectedly move laterally to the inner positions and be switched in position, however, for this problem, by employing the construction according to the second aspect, at least when the receivers are at the outer positions, the engagement recesses and the engagement members can reliably prevent the receivers from moving to the inner positions, so that the receivers can be held at the outer positions without fail and safety can be increased. To switch the receivers at the outer positions to the inner positions, the receivers themselves are pushed up so that the engagement recesses are disengaged upward from the engagement members, and in comparison with the conventional case where small lock pins projecting laterally sideward from the receivers must be pushed up, the construction of the means for pushing-up to be installed on the traveling route side of the conveying traveling body becomes simpler.

According to the third aspect, to switch the receivers at the inner positions to the outer positions, it is not necessary to release the engagement between the engagement recesses and the engagement members by pushing up the receivers, and the receivers are only directly forcibly moved to the outer positions, so that among receiver switching positions set in the traveling route of the conveying traveling body, at the receiver switching position for switching the receiver at the inner position to the outer position, provision of the unlocking means, that is, provision of the receiver pushing-up means is omitted and the construction is simplified, and the cost can be reduced. In addition, to move the receivers from the inner positions to the outer positions, the engagement recesses must get onto and disengage from the engagement members against the urging forces of the urging means, so that resistance for this releasing can be made sufficiently high and the danger of unexpected movements of the receivers from the inner positions to the outer positions due to vibrations can be eliminated.

In addition, according to the fourth aspect, not only can the entirety including the receiver and the support structure for the receiver on the hanger arm lower end inner side be made compact, but also the receiver pushing-up means to be provided on the conveying route side can also be made compact. In this case, according to the fifth aspect, the support structure for the receiver on the hanger arm lower end inner side becomes simpler. Furthermore, according to a sixth aspect, the stability of the receivers can be increased.

Furthermore, according to the seventh aspect, the tension springs constituting the urging means have a flat and very simple structure obtained only by bending both ends of a straight spring wire material into arc shapes, and in comparison with the conventional case where a tension coil spring having arched hooks formed on both ends is used as an urging means, the cost can be further reduced, and the urging means can be incorporated in the receiver support structure if a space slightly wider than the diameter of the spring wire material is secured in the structure, so that the lateral width of the receiver support structure can be greatly narrowed. In this case, according to the eighth aspect, the tension spring can be increased in effective length, and can be incorporated so as not to easily come off.

DESCRIPTION OF SYMBOLS

1: conveying traveling body
14: hanger for supporting an object to be conveyed 15: a pair of front left and right hanger arms
16: a pair of rear left and right hanger arms
18: receiver
21a, 21b: a pair of receiver support members
22a, 22b: a pair of link shaft support members
23, 24: two pairs of parallel links
25a, 25b: link
26a, 26b: lower support shaft
27a, 27b: upper support shaft
28, 28b: tension spring
31: long hole
32a, 32b: two inner and outer engagement recesses
33: engagement member
34: vertical engagement surface
35A, 35B: receiver pushing-up means
36A, 36B: receiver drive means
37a, 37b: a pair of left and right movable members
38: elevating guide rod
39: fluid pressure cylinder
40: elevating support arm
41: pusher
42: downward open groove shaped member
43: a pair of left and right movable members
45: slide guide rail
46: slider
47: a pair of left and right fluid pressure cylinders
P1: inner position of position switching target receiver
P2: outer position of position switching target receiver
W: object to be conveyed

DESCRIPTION OF THE PREFERRED EMBODIMENTS

Figure 1:
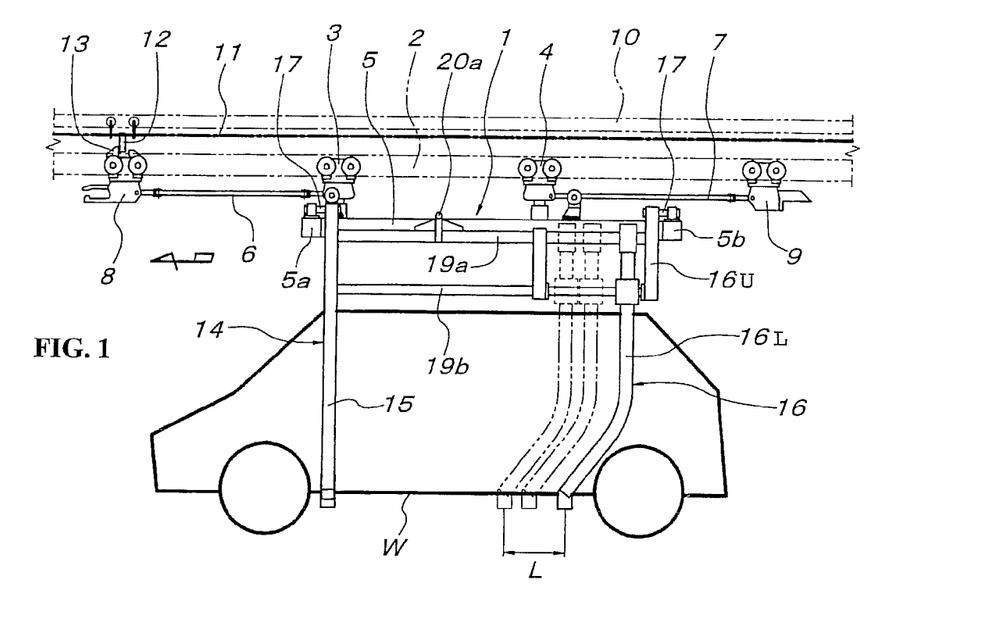
FIG. 1 is a side view showing a conveying traveling body having a hanger for supporting an object to be conveyed.
Figure 2:
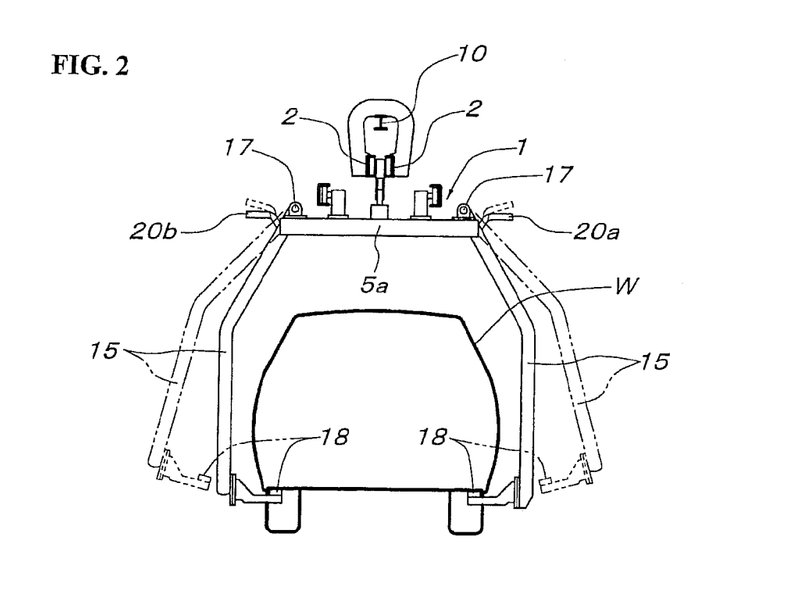
FIG. 2 is a front view of the same conveying traveling body.

Hereinafter, a detailed embodiment of the invention will be described based on the accompanying drawings. In FIG. 1 and FIG. 2, the reference numeral 1 denotes a conveying traveling body constituted of a pair of front and rear load trolleys 3 and 4 supported on trolley guide rails 2, load bars 5 suspended by these load trolleys 3 and 4, and a front free trolley 8 and a rear free trolley 9 which are connected to the respective load trolleys 3 and 4 by connection rods 6 and 7 and supported on the trolley guide rails 2. This conveying traveling body 1 is driven when a pusher 12 provided on a drive chain 11 which is suspended on a drive chain guide rail 10 laid on upper sides of the trolley guide rails 2 along the trolley guide rails via a trolley and is driven by a drive means that is not shown pushes, from the rear side, a main dog 13 which is provided on the front free trolley 8 so as to advance and retreat.

In the conveying traveling body 1, a hanger 14 for supporting an object to be conveyed is suspended from a load bar 5. This hanger 14 is constituted of a pair of front left and right hanger arms 15 and a pair of rear left and right hanger arms 16, and each of the pairs of left and right hanger arms 15 and 16 is pivotally supported on left and right ends of lateral members 5a and 5b continuously provided laterally on the front and rear ends of the load bar 5 so as to be opened and closed to the left and right by horizontal support shafts 17 in the front and rear direction, and whose lower end inner sides are provided with receivers 18 which support bottom sections of left and right sides of an object to be conveyed W.

In the hanger 14 of this embodiment, the pair of rear left and right hanger arms 16 are divided into arm upper parts 16U and arm lower parts 16L having receivers 18, and the arm upper parts 16U are pivotally supported by the support shafts 17 and connected to upper sections of the pair of front left and right hanger arms 15 by the respective pair of left and right connection members 19a and 19b in the front and rear direction, and the arm lower parts 16L are supported by the connection members 19a and 19b while enabled to change in position in the front and rear direction in a range L. Therefore, by changing the positions in the front and rear direction of the arm lower parts 16L of the pair of rear left and right hanger arms 16, the distance between the receivers 18 of the pair of front left and right hanger arms 15 and the receivers 18 of the pair of rear left and right hanger arms 16 can be changed according to a type of the object to be conveyed W. By pushing up opening levers 20a and 20b provided on the pair of left and right connection members 19a in the front and rear direction by operation means provided by the side of the traveling route, the pair of front left and right hanger arms 15 and the pair of rear left and right hanger arms 16 can be opened integrally.

In the hanger 14 of this embodiment, the receivers 18 of the pair of rear left and right hanger arms 16 can be changed in position in the opening and closing direction (left and right lateral direction) of the hanger arms 16. In the following detailed description of the structure and action, the receivers 18 of the pair of rear left and right hanger arms 16 will be referred to as position switching target receivers 18.

Figure 3:
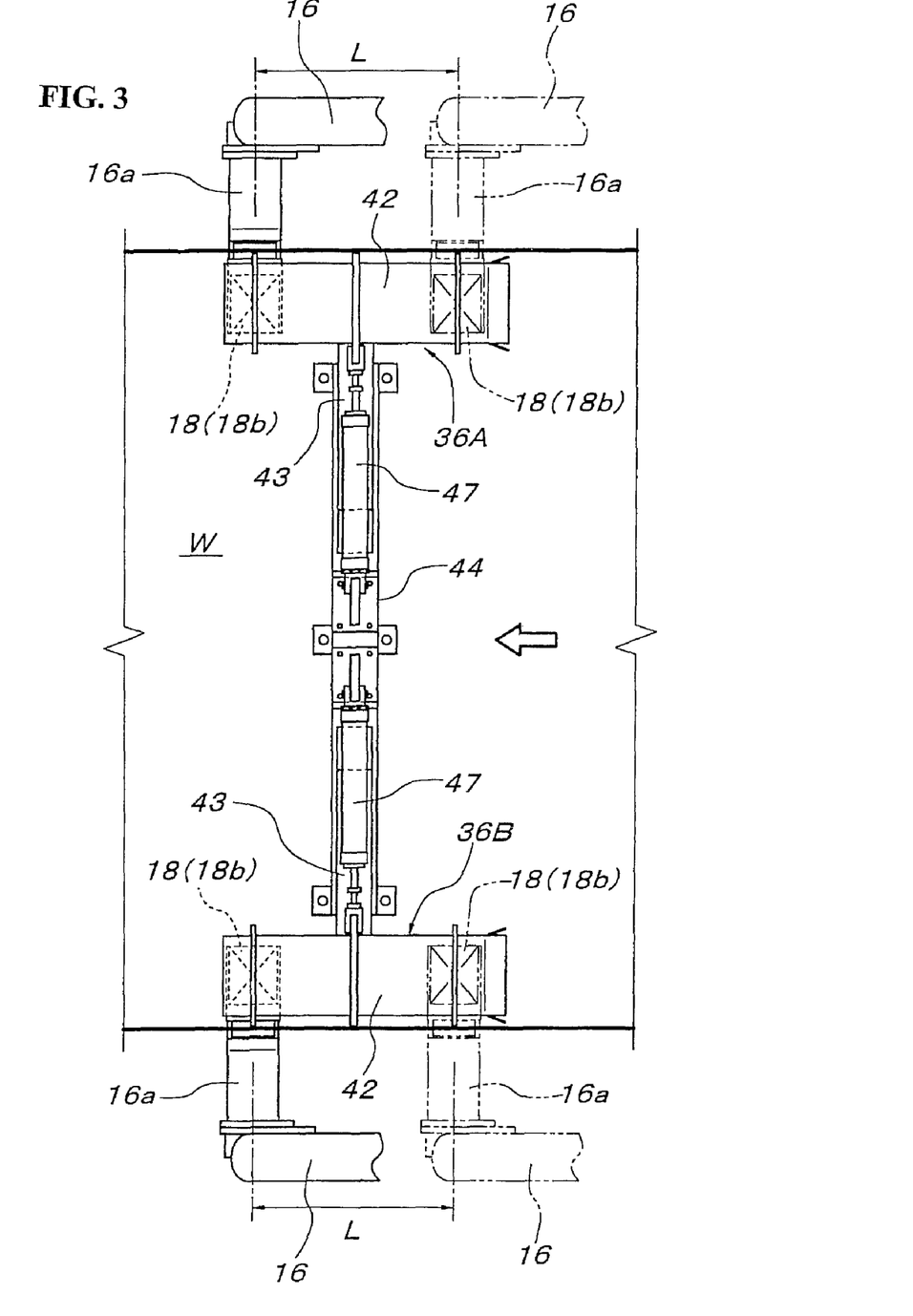
FIG. 3 is a plan view showing receiver drive means at a receiver switching position and receivers.
Figure 4:
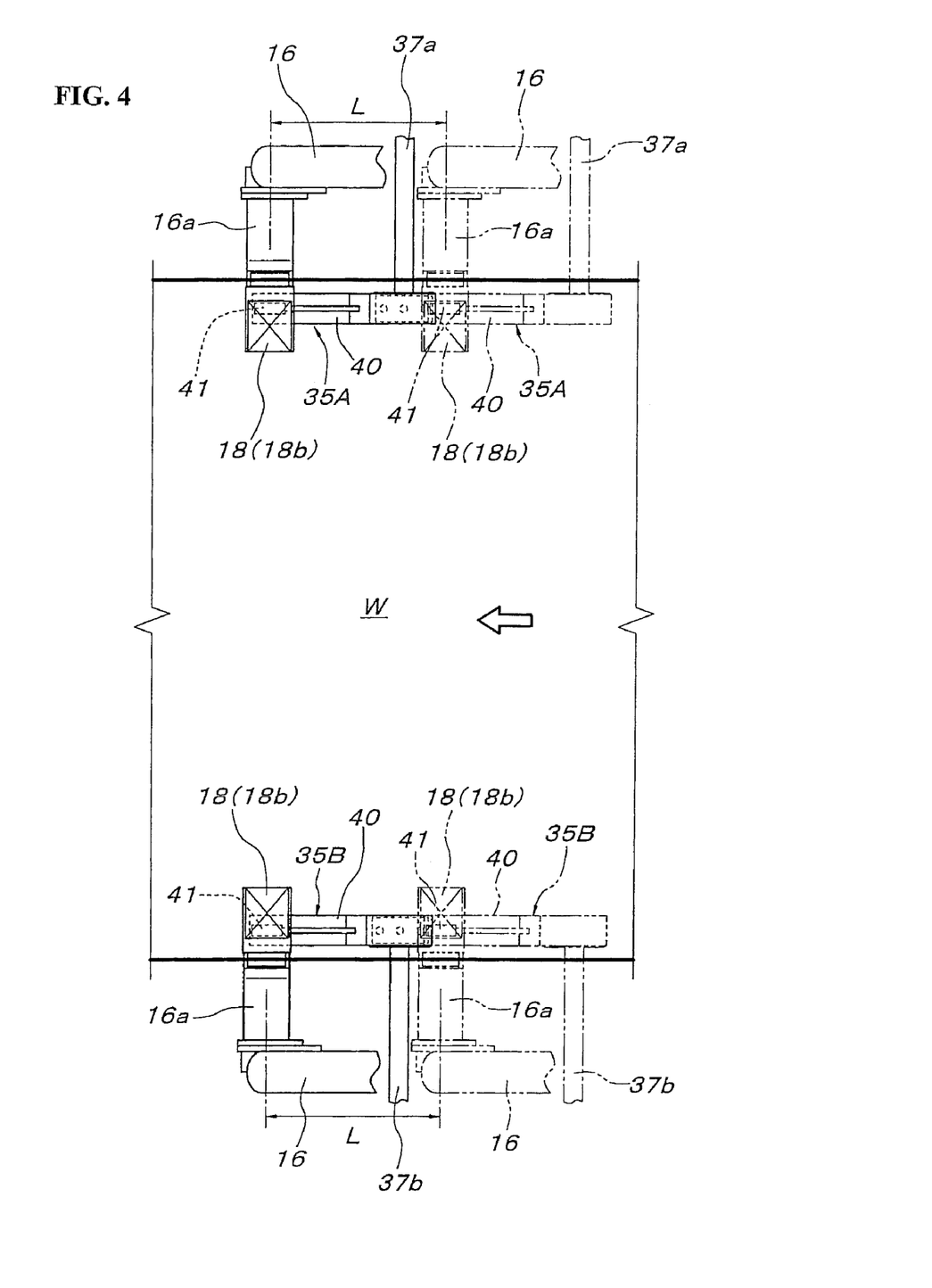
FIG. 4 is a plan view showing receiver pushing-up means and receivers.
Figure 5:
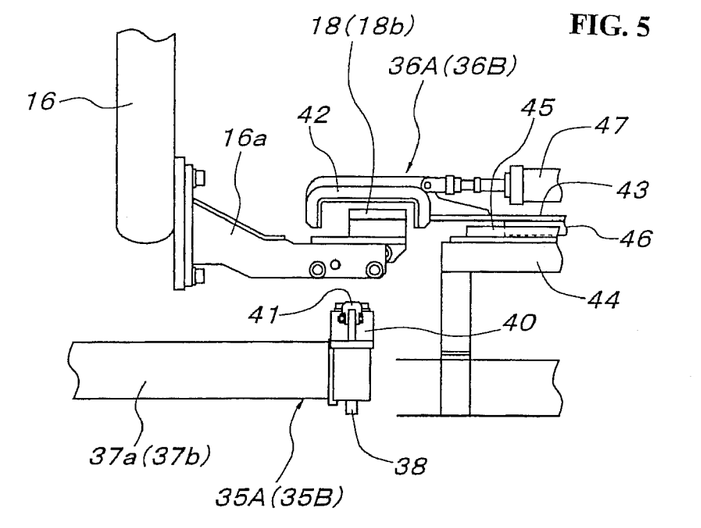
FIG. 5 is a back view showing a receiver drive means, a receiver pushing-up means, and a receiver on one side at a receiver switching position.
Figure 6:
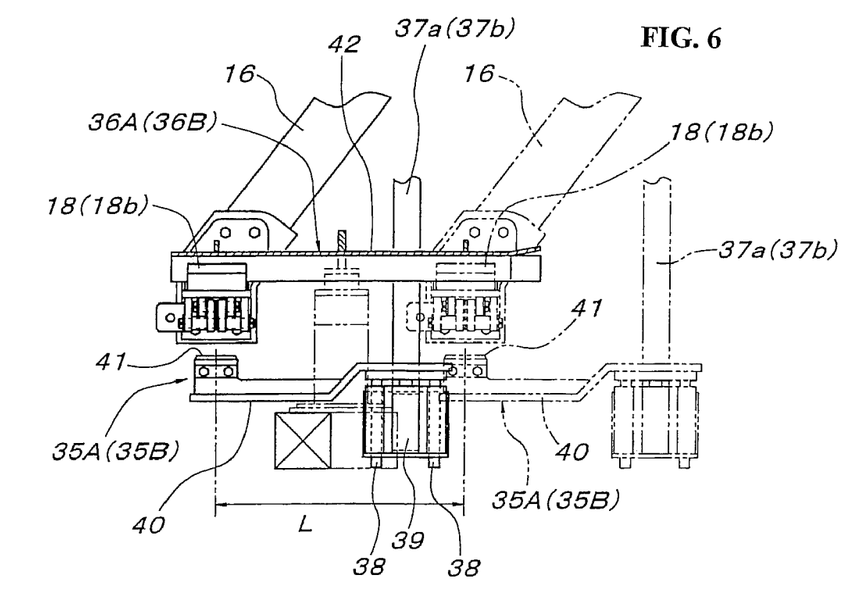
FIG. 6 is a partially longitudinal sectional side view showing a receiver drive means, a receiver pushing-up means, and a receiver on one side at the receiver switching position from the inner side.

On the lower ends of the pair of rear left and right hanger arms 16, that is, on the lower ends of the arm lower parts 16L, as shown in FIG. 3 through FIG. 5, receiver support arm parts 16a extending inward are provided, and at the tip end of this receiver support arm part 16a, a pair of receiver support members 21a and 21b projecting inward are provided in parallel. The position switching target receiver 18 is provided with an attachment 18b for supporting an object to be conveyed above a substrate 18a supported movably in the hanger arm opening and closing direction on the receiver support members 21a and 21b. Below the substrate 18a, a pair of link shaft support members 22a and 22b are projectedly provided which are in parallel to the receiver support members 21a and 21b and freely fit between the receiver support members 21a and 21b, the link shaft support members 22a and 22b and the receiver support members 21a and 21b are connected by two pairs of parallel links 23 and 24 provided in parallel between the pair of link shaft support members 22a and 22b.

The lower ends of a pair of links 25a and 25b parallel to each other forming the parallel links 23 and 24 are supported by lower support shafts 26a and 26b laid across the pair of receiver support members 21a and 21b, and the upper ends of the links 25a and 25b are supported by upper support shafts 27a and 27b laid across the pair of link shaft support members 22a and 22b. Therefore, the position switching target receiver 18 can move in parallel between the inner position P1 and the outer position P2 in the hanger arm opening and closing direction while accompanied by parallel swings of the two pairs of parallel links 23 and 24. At the time of this parallel movement between the inner position P1 and the outer position P2, the substrate 18a of the position switching target receiver 18 floats from the pair of receiver support members 21a and 21b, however, it is supported by the pair of receiver support members 21a and 21b when it is at the inner position P1 and the outer position P2 on both ends.

Two pairs of tension springs 28a and 28b are interposed between the pair of link shaft support members 22a and 22b on the position switching target receiver 18 side and the pair of receiver support members 21a and 21b on the hanger arm 16 side, as spring members for pulling down the position switching target receiver 18 to the receiver support member 21a and 21b side. The tension springs 28a and 28b are formed by bending spring wire materials into S shapes, and are interposed by externally fitting both end arc sections 29 and 30 to the upper support shafts 27a and 27b on the link shaft support members 22a and 22b side and the lower support shafts 26a and 26b on the receiver support member 21a and 21b side, and at this time, the initial lengths of the tension springs 28a and 28b are set so that the distances between both end arc sections 29 and 30 are slightly extended due to deformation against the elasticity of both end arc sections 29 and 30, and tension is applied between the upper support shafts 27a and 27b and the lower support shafts 26a and 26b.

In this embodiment, in order to obtain tension with necessary strength, two tension springs 28a and 28b are interposed each between the upper side support shafts 27a and 27b and the lower support shafts 26a and 26b, however, depending on the design of the tension springs 28a and 28b, one tension spring 28a or 28b may be interposed each between the upper support shafts 27a and 27b and the lower support shafts 26a and 26b, or according to the circumstances, one or two parallel tension springs 28a (or 28b) may be interposed between the upper support shaft 27a (or 27b) and the lower support shaft 26a (or 26b). Separately from the upper support shafts 27a and 27b and the lower support shafts 26a and 26b pivotally supporting the parallel links, it is also possible that the pair of link shaft support members 22a and 22b on the receiver 18 side and the pair of receiver support members 21a and 21b on the hanger arm 16 side are provided with spring engagement sections, and tension springs are interposed between these spring engagement sections. Of course, as the spring members, other than the tension springs 28a ad 28b constructed as described above, general coil springs and leaf springs can be used.

Figure 7:
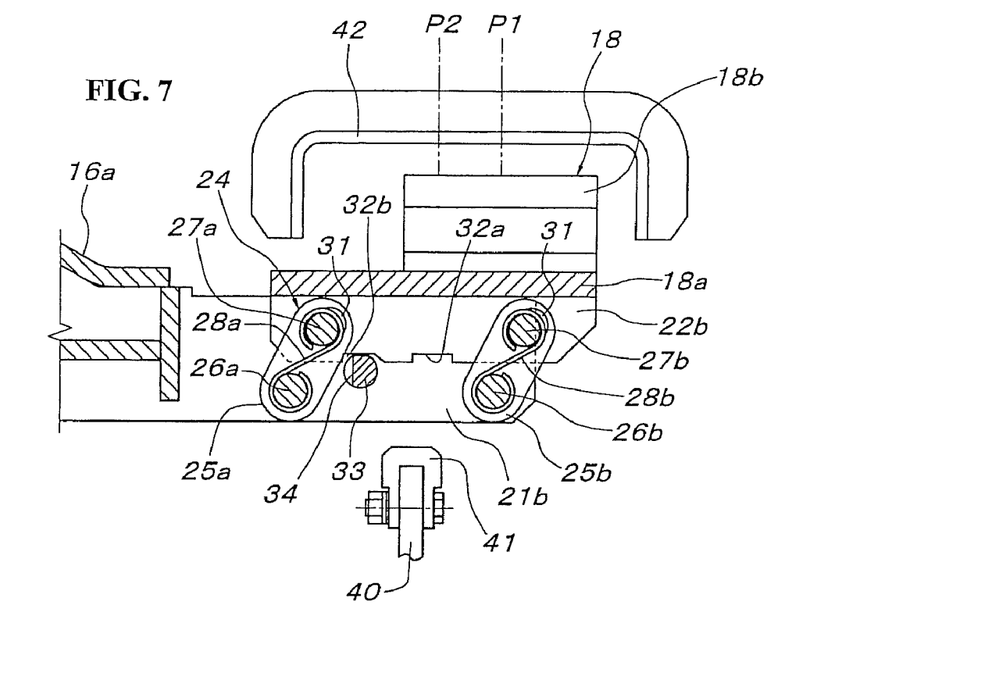
FIG. 7 is a longitudinal sectional front view of a main part showing a receiver held at an inner position, a receiver drive means, and a receiver pushing-up means.
Figure 8:
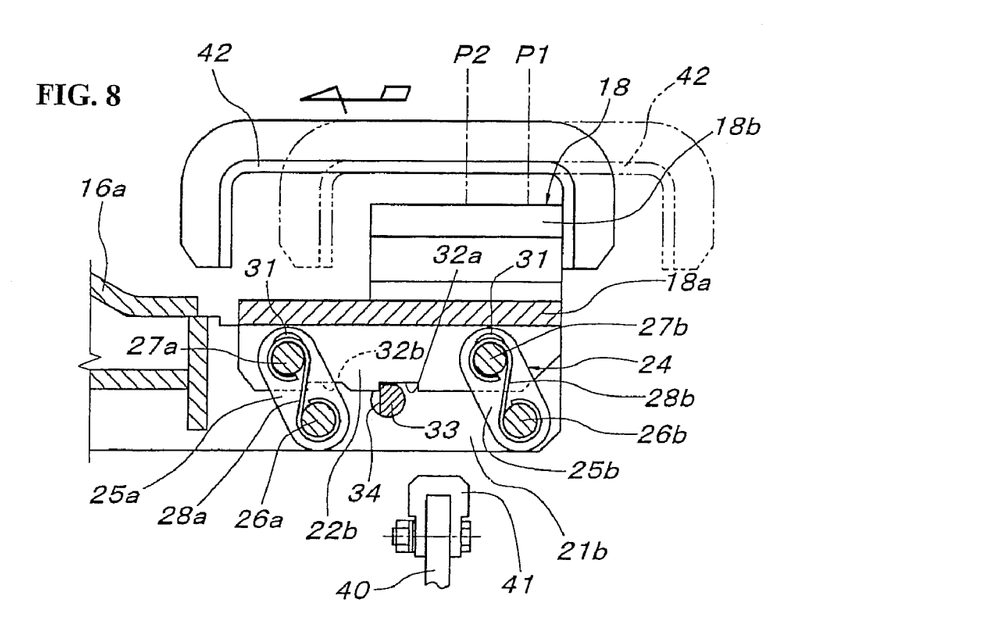
FIG. 8 is a longitudinal sectional front view of the main part showing a state that the receiver shown in FIG. 7 is moved to an outer position by the receiver drive means.
Figure 11:
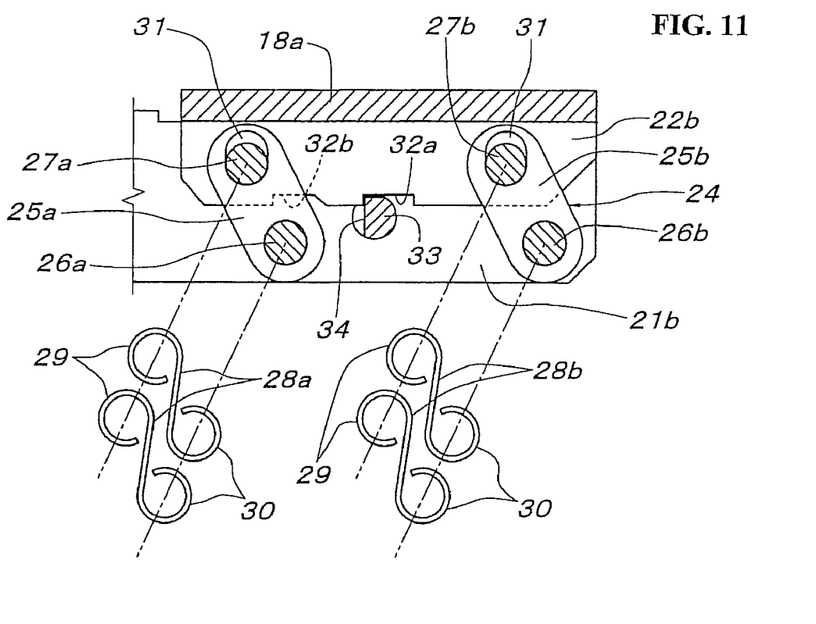
FIG. 11 is a partially exploded longitudinal sectional side view showing details of a receiver support-structure.
Figure 12:
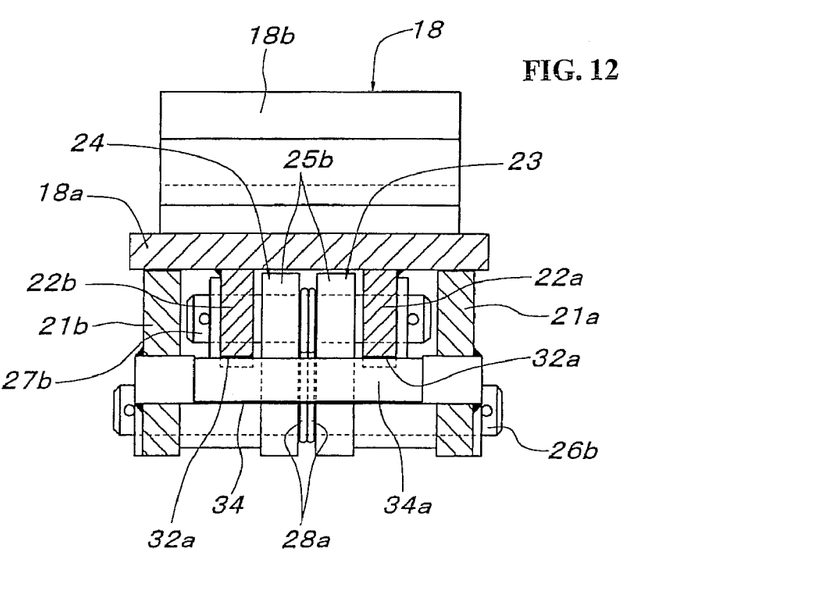
FIG. 12 is a longitudinal sectional side view of the receiver support structure at an engagement member position.

As shown in FIG. 11, shaft holes for inserting through the upper support shafts 27a and 27b are provided on upper ends of the links 25a and 25b of the parallel links 23 and 24, which serve as long holes 31 which extend vertically upward from the upper support shafts 27a and 27b when the position switching target receiver 18 is at the outer position P2 (see FIG. 8). Therefore, at the inner position P1 (see FIG. 7) or the outer position P2 (see FIG. 8), the position switching target receiver 18 which is at a level at which the substrate 18a is supported by the pair of receiver support members 21a and 21b can be moved up in the range of the long holes 31 against the tensions of the tension springs 28a and 28b in the longitudinal directions of the long holes 31.

At middle positions of the parallel links 23 and 24 on the lower sides of the pair of link shaft support members 22a and 22b on the position switching target receiver 18 side, at two points in the lower side longitudinal direction (two inner and outer points in the hanger arm opening and closing direction), engagement recesses 32a and 32b are provided. Between the pair of receiver support members 21a and 21b of the hanger arm 16 side, an engagement member 33 is provided which engages in the inner engagement recess 32a when the position switching target receiver 18 is at the outer position P2 (see FIG. 8) and engages in the outer engagement recess 32b when the position switching target receiver 18 is at the inner position P1 (see FIG. 7). This engagement member 33 is formed of a round rod material whose both ends are fixed by means of welding, etc., to the pair of receiver support members 21a and 21b at the middle position of the parallel links 23 and 24, and a vertical engagement surface 34 is formed by cutting in the round rod material peripheral surface. In a state that the position switching target receiver 18 is at the outer position P2 and the engagement member 33 engages in the inner engagement recess 32a, the vertical engagement surface 34 of the engagement member 33 comes into contact with the inner vertical surface on one side of the inner engagement recess 32a to prevent the position switching target receiver 18 from moving to the inner position P1. When the position switching target receiver 18 at the inner position P1 shown in FIG. 7 moves to the outer position P2, the position switching target receiver 18 (lower sides of the pair of link shaft support members 22a and 22b) gets onto the engagement member 33 engaged in one side in the outer engagement recess 32b by using a downward widening inclined side surface on one side of the outer engagement recess 32b and the round rod material peripheral surface of the engagement member 33) to release the engagement between the outer engagement recess 32b and the engagement member 33. The position switching target receiver 18 (lower sides of the pair of link shaft support members 22a and 22b) gets onto the engagement member 33 while performing upward movements of the upper support shafts 27a and 27b in the long hole 31 and an upward movement of the position switching target receiver 18 (the pair of link shaft support members 22a and 22b) according to swinging and standing of the parallel links 23 and 24.

As is clear from the above-described construction, as shown in FIG. 7, the position switching target receiver 18 at the inner position P1 is only held at the inner position P1 by engagement of the outer engagement recess 32b with the engagement member 33 by the tensile forces of the tension springs 28a and 28b, so that the position switching target receiver 18 can be forcibly moved to the outer position P2 by a predetermined or stronger operating force, however, as shown in FIG. 8, the position switching target receiver 18 at the outer position P2 is held at this outer position P2 by engagement of the inner engagement recess 32a with the engagement member 33 by the tensile forces of the tension springs 28a and 28b and simultaneously completely prevented from moving to the inner position P1 by the contact between the inner vertical surface on one side of the inner engagement recess 32a and the vertical engagement surface 34 of the engagement member 33. That is, the position switching target receiver 18 is locked at the outer position P2, and in this state the position switching target receiver 18 cannot be forcibly moved to the inner position P1.

As shown in FIG. 3 through FIG. 6, at the receiver switching positions set in the traveling route of the conveying traveling body 1, receiver pushing-up means 35A and 35B and the receiver drive means 36A and 36B are provided. The receiver pushing-up means 35A and 35B and the receiver drive means 36B and 36B are provided one pair each on the left and right sides parallel to each other so as to correspond to the receivers 18, that is, the position switching target receivers of the pair of rear left and right hanger arms 16 of the hanger 14 for supporting an object to be conveyed of the conveying traveling body 1 when the conveying traveling body 1 stops at a predetermined position, and as described above, the pair of rear left and right hanger arms 16 including the position switching target receivers 18 are changeable in position in the range L, so that the positions of the receiver pushing-up means 35A and 35B are automatically adjusted to be front and rear in the traveling direction of the conveying traveling body 1 in accordance with current positions of the pair of rear let and right arms 16 when the conveying traveling body 1 stops at a predetermined position.

Figure 10:
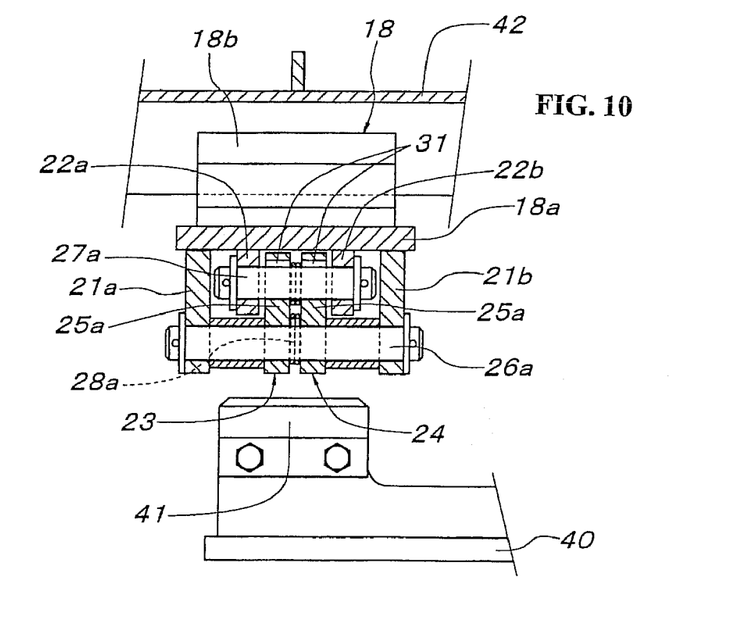
FIG. 10 is a longitudinal sectional side view of FIG. 7 or FIG. 8.

That is, the receiving pushing-up means 35A and 35B are attached to a pair of left and right movable members 37a and 37b, respectively, which are automatically adjusted in position to be front and rear in the traveling direction of the conveying traveling body 1 in an interlocked manner according to current positions of the pair of rear left and right hanger arms 16 when the conveying traveling body 1 stops at a predetermined position, and is constituted of elevating support arms 40 which are supported on inner ends of the movable members 37a and 37b while enabled to freely elevate via elevating guide rods 38 and are driven to elevate in a predetermined range by fluid pressure cylinders 39, and pushers 41 attached to tip end upper sides of the elevating support arms 40, and as shown in FIG. 8, the conveying traveling body 1 whose position switching target receivers 18 are held at the outer positions P2 stops at a predetermined position, as shown in FIG. 8 and FIG. 10, the pusher 41 is positioned just below the point between the inner links 25a of the parallel links 23 and 24 and engagement members 33, and in this state by raising the elevating support arms 40 by the fluid pressure cylinders 39, the pusher 41 enters between the pair of left and right receiver support members 41a and 41b from below and can pushup the position switching target receiver 18 via the pair of left and right link shaft support members 22a and 22b.

The receiver drive means 36A and 36B can also be provided with downward open groove-shaped members 45 the same length as that of the range L which can fit to the attachments 18b for supporting an object to be conveyed on the position switching target receivers 18 on the lower end inner sides of the pair of rear left and right hanger arms 16 wherever the current positions of the hanger arms 16 are in the range L when the conveying traveling body 1 stops at a predetermined position. The pair of left and right movable members 43 which individually support the groove-shaped members 42 at their outer ends are supported laterally movably in the left and right direction (opening and closing direction of the hanger arms 16 via a slide guide rail 45 and a slider 46 fitting to the slide guide rail on a mount 44 extending in the left and right lateral direction disposed below the traveling route of the hanger 14 for supporting an object to be conveyed, and are driven to reciprocate by a pair of left and right fluid pressure cylinders 47 interposed between the mount 44 and the groove-shaped members 42.

Figure 9:
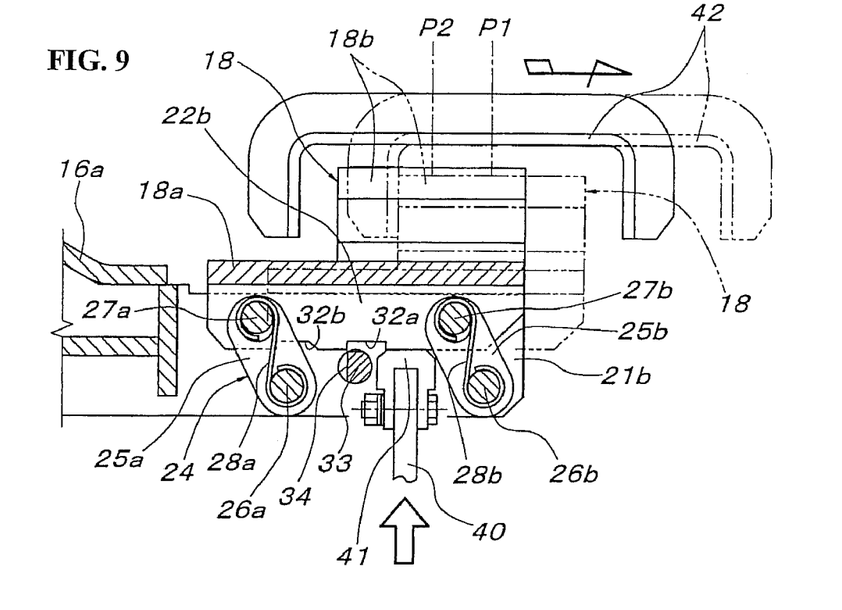
FIG. 9 is a longitudinal front view of the main part showing a state that the receiver at the outer position is pushed up by the receiver pushing-up means.

In the conveyance apparatus constructed as described above, when the conveying traveling body 1 whose position switching target receivers 18 are held at the outer positions P2 arrives at the receiver switching positions, by positional adjustments of the movable members 37a and 37b before or after this conveying traveling body 1 arrives at the receiver switching position, as shown in FIG. 8 and FIG. 10, the receiver pushing-up means 35A and 35B positioned at predetermined positions immediately below these position switching target receivers 18 are actuated. That is, by raising the elevating support arms 40 by the fluid pressure cylinders 39, as shown in FIG. 9, the pushers 41 which enter between the pair of left and right receiver support members 21a and 21b from below push up the position switching target receivers 18 via the pair of left and right link shaft support members 22a and 22b. As a result, with respect to the engagement members 33 fitted in the inner engagement recesses 32a on the lower sides of the pair of left and right link shaft support members 22a and 22b as shown in FIG. 8, the link shaft support members 22a and 22b are pushed up in the range of the lengths of the long holes 31 as shown in FIG. 9, and the inner engagement recesses 32a are disengaged from the engagement members 33 upward and the position switching target receivers 18 at the outer positions P2 are unlocked.

On the other hand, when the conveying traveling body 1 arrives at the receiver switching positions, wherever the pair of rear left and right hanger arms 16 are in the adjusting range L and whichever the positions of the position switching target receivers 18 are at the inner positions P1 or the outer positions P2, these position switching target receivers 18 enter the insides of the downward open groove-shaped members 42 waiting at home positions of the receiver drive means 36A and 36B as shown in FIG. 7 and FIG. 9. Therefore, as described above, the fluid pressure cylinders 47 of the receiver drive means 36A and 36B are actuated after the position switching target receivers 18 at the outer positions P2 are unlocked by the receiver pushing-up means 35A and 35B and, as shown by the imaginary lines of FIG. 9, the groove-shaped members 42 are moved laterally to the inner side (the central position sides in the left and right width direction of the conveying route) from the home positions, whereby the position switching target receivers 18 unlocked at the outer positions P2 can be moved to the inner positions P1 via the attachments 18b for supporting an object to be conveyed.

After the inner engagement recesses 32a move away from the engagement members 33 from the positions immediately above the engagement members 33, the pushers 41 of the receiver pushing-up means 35A and 35B which had pushed up the position switching target receivers 18 for unlocking are dropped until the position switching target receivers 18 reach the inner positions P1. As a result, when the position switching target receivers 18 reach the inner positions P1, as shown in FIG. 7, the position switching target receivers 18 are pulled down by the tensile forces of the tension springs 28a and 28b, so that the outer engagement recesses 32b engage with the engagement members 33 and hold the position switching target receivers 18 at the inner positions P1.

Position switching of the position switching target receivers 18 are performed as described above by unlocking the position switching target receivers 18 locked at the outer positions P2 by the receiver pushing-up means 35A and 35B and moving these to the inner positions P1 by the receiver drive means 35A and 35B, however, as shown in FIG. 7, to switch the positions of the position switching target receivers 18 held at the inner positions P1 to the outer positions P2, the groove-shaped members 42 of the receiver drive means 36A and 36B are immediately moved laterally outward from the home positions without actuating the receiver pushing-up means 35A and 35B. In this case, as aforementioned, when the position switching target receivers 18 are forcibly moved from the inner positions P1 and the outer positions P2 by lateral movements of the groove-shaped members 42 via the attachments 18b for supporting an object to be conveyed fitting to the groove-shaped members 42, the outer engagement recesses 32b gets onto and over the engagement members 33 and move outward while performing upward movements of the position switching target receivers 18 against the tensile forces of the tension springs 28a and 28b. Then, when the position switching target receivers 18 reach the outer positions P2, as shown in FIG. 8, the position switching target receivers 18 are pulled down by the tensile forces of the tension springs 28a and 28b, the inner engagement recesses 32a engage with the engagement members 33, and the position switching target receivers 18 supported by the receiver support members 21a and 21b are locked by the engagement members 33 (vertical engagement surfaces 34) and the inner engagement recesses 32a engaging with the engagement members.

As the hanger 14 for supporting an object to be conveyed, one including a pair of rear left and right hanger arms 16 whose positions are changeable for adjusting the distance to the pair of front left and right hanger arms is illustrated, however, the hanger 14 for supporting an object to be conveyed may also have front and rear hanger arms 15 and 16 with a fixed distance therebetween. In addition, the hanger 14 with two front and rear pairs of hanger arms 15 and 16 is illustrated, however, a hanger for supporting an object to be conveyed which has a pair of left and right hanger arms including front receivers and rear receivers may also be used. Furthermore, among four receivers 18 in total of two front and rear pairs on the left and right sides, the pair of rear left and right receivers 18 are made switchable in position between the inner and outer positions in the hanger arm opening and closing direction, however, all receivers 18 may also be switchable in position.

An example in which the receiver pushing-up means 35A and 35B and the receiver drive means 36A and 36B are provided at the receiver switching positions set in the traveling route of the conveying traveling body 1, is described above, however, if there are provided with receiver switching positions at which only switching of the position switching target receivers 18 from the inner positions P1 to the outer positions P2 is performed, at these receiver switching positions, the receiver pushing-up means 35A and 35B are unnecessary. However, similar to the relationship between the inner engagement recesses 32a and the engagement members 33, when the outer engagement recesses 32b and the engagement members 33 are shaped to prevent the position switching target receivers 18 held at the inner positions P1 from moving to the outer positions P2 and the long holes 31 are formed to extend upward directly above the upper support shafts 27a and 27b when the position switching target receivers 18 are held at the inner positions P1 (that is, formed into fan shapes) so as to enable the position switching target receivers 18 to also be locked at the inner positions P1, the receiver pushing-up means 35A and 35B are necessary at all receiving switching positions.

The suspension conveyance apparatus according to the invention can be effectively utilized in an automobile assembly line for assembling parts into automobile bodies when at least two types of automobiles to be suspended on and conveyed by an openable and closable hanger, supported by the hanger at different supported positions in the left and right lateral direction.

What is claimed is:

1. A suspension conveyance apparatus in which a hanger for supporting an object to be conveyed suspended on a conveying traveling body comprising a pair of left and right openable and closable hanger arms which have receivers for an object to be conveyed on lower end inner sides and are pivotally supported at upper end sides thereof so as to freely swing to the left and right, wherein the receivers are switchable in position between inner positions and outer positions in an opening and closing direction with respect to the hanger arms, wherein the receivers are supported on receiver support members on hanger arm sides by parallel links laterally movably between the inner and outer positions, wherein at shaft support sections of the parallel links, long holes which allow vertical movements of the receivers are provided and urging means for urging the receivers in a direction to pull down the receivers onto the receiver support members are provided, and wherein at receiver switching positions in a traveling route of the conveying traveling body, receiver drive means are provided which move the receivers between the inner and outer positions.

2. The suspension conveyance apparatus according to claim 1, wherein, an inner engagement recess is provided which engages with an engagement member when the receiver is at the outer position, and the engagement member prevents the receiver from moving to the inner position, and among the receiver switching positions at which the receiver drive means are provided, at a receiver switching position for switching the receiver from the outer position to the inner position, a receiver pushing-up means is provided which pushes up the receiver from the level supported by the receiver support members to release the engagement between the inner engagement recess and the engagement member.

3. The suspension conveyance apparatus according to claim 2, wherein an outer engagement recess is provided which engages with the engagement member when the receiver is at the inner position, and the engagement member enables the receiver to get onto and past the engagement member when the receiver moves to the outer position.

4. The suspension conveyance apparatus according to claim 2, wherein a pair of receiver support members are arranged in parallel, link shaft support members which freely fit between the pair of receiver support members are projectedly provided on the receiver supported on these receiver support members, and the parallel links are interposed between lower support shafts laid across the pair of receiver support members and upper support shafts provided on the link shaft support members, and long holes at the shaft support sections of the parallel links are provided as shaft holes which the upper support shafts of the parallel links are inserted through, and the two inner and outer engagement recesses are formed on the lower sides of the link shaft support members, the engagement member is laid across the pair of receiver support members, and the receiver pushing-up means is constructed to push up the lower sides of the link shaft support members between the pair of receiver support members.

5. The suspension conveyance apparatus according to claim 2, wherein the urging means comprises tension springs interposed between the lower support shafts and the upper support shafts which support the parallel links.

6. The suspension conveyance apparatus according to claim 5, wherein the link shaft support members and the parallel links comprise one pair each arranged in parallel, and the tension springs are disposed between the pair of link shaft support members.

7. The suspension conveyance apparatus according to claim 5, wherein the tension springs are flat springs formed by bending both ends of a straight spring wire material into arc shapes on the same plane, and both arc sections are hooked around the lower support shafts and the upper support shafts.

8. The suspension conveyance apparatus according to claim 7, wherein the tension springs are in S shapes whose arc sections on both ends are bent oppositely to each other.

* * * * *